(12) United States Patent
Kimura (10) Patent No.: US 8,705,763 B2
(45) Date of Patent: Apr. 22, 2014

(54) IN-VEHICLE AUDIO DEVICE AND IN-VEHICLE AUDIO SYSTEM

(75) Inventor: Yousuke Kimura, Nagoya (JP)

(73) Assignee: DENSO CORPORATION, Kariya (JP)

( * ) Notice: Subject to any disclaimer, the term of this patent is extended or adjusted under 35 U.S.C. 154(b) by 439 days.

(21) Appl. No.: 12/926,263

(22) Filed: Nov. 4, 2010

(65) Prior Publication Data

US 2011/0110530 A1    May 12, 2011

(30) Foreign Application Priority Data

Nov. 6, 2009   (JP) .................. 2009-255171

(51) Int. Cl.
    *H04B 1/00*   (2006.01)
(52) U.S. Cl.
    USPC ............... 381/86; 381/302; 381/123; 381/22; 455/569.2; 455/575.9
(58) Field of Classification Search
    USPC ........ 381/86, 71.4, 119, 123, 11, 22, 23, 302, 381/306, 311, 78, 79, 80, 81, 85, 333, 334, 381/307, 309, 82, 332, 118; 455/569.2, 455/575.9, 95, 96, 99, 152.1, 345; 340/825.24, 825.25, 474; 700/94
    See application file for complete search history.

(56) References Cited

U.S. PATENT DOCUMENTS

2001/0048749 A1* 12/2001 Ohmura et al. .................. 381/86
2008/0154406 A1*  6/2008 Nunokawa ...................... 700/94

FOREIGN PATENT DOCUMENTS

JP     A-2006-284755     10/2006

OTHER PUBLICATIONS

Office Action mailed Aug. 23, 2011 in corresponding JP application No. 2009-255171 (and English translation).

* cited by examiner

*Primary Examiner* — Vivian Chin
*Assistant Examiner* — Leshui Zhang
(74) *Attorney, Agent, or Firm* — Posz Law Group, PLC (57) ABSTRACT

An in-vehicle audio device and an in-vehicle audio system are disclosed. The in-vehicle audio device acquires and registers metadata of music data from multiple music possession devices, at least one of which is a portable music carrier device capable of performing wireless communication. Regarding the metadata acquired from the portable music carrier device, the in-vehicle audio device maintains the registration of the metadata after a communication connection between the portable music carrier device and the in-vehicle audio device is cut off. The in-vehicle audio device creates a playlist based on the registered metadata.

9 Claims, 5 Drawing Sheets

IN-VEHICLE AUDIO DEVICE AND IN-VEHICLE AUDIO SYSTEM

CROSS REFERENCE TO RELATED APPLICATION

The present application is based on Japanese Patent Application No. 2009-255171 filed on Nov. 6, 2009, disclosure of which is incorporated herein by reference.

BACKGROUND OF THE INVENTION

1. Field of the Invention

The present invention relates to an in-vehicle audio device and an in-vehicle audio system.

2. Description of Related Art

There is known an in-vehicle audio device for playing back music data stored in a storage medium such as CD (compact disk), MD (mini disk), HDD (hard disk drive) and the like, and for outputting the played-back sound from a speaker. There is also known a portable audio terminal (e.g., a portable audio player) capable storing huge music data and playing back music data.

In recent years, a technique has been proposed for the in-vehicle audio device to play back music data stored in the portable audio terminal carried into a vehicle. For example, Patent Document 1 discloses an audio system for a vehicle. In the audio system, when multiple portable audio terminals (i.e., multiple portable audio devices) are carried into the vehicle, transmission of music data is performed between the multiple portable audio terminals and the in-vehicle audio device by wireless communication in the vehicle, and the in-vehicle audio device plays back the music data stored in respective portable audio terminals.

According to Patent Document 1, when a portable audio terminal and the in-vehicle audio device recognize and authenticate each other to configure a network, the in-vehicle audio device can display a list of tracks of the music data stored in the currently-connected portable audio terminal on a portable audio terminal basis. Further, when a track is selected from the list of tracks and when an in-vehicle speaker is selected as a sound output device, the music data of the selected track is played back and outputted.

Patent Document 1: JP 2001-296875A corresponding to US 2001/0048749A

The inventor of the present application has found out that the technique disclosed in Patent Document 1 involves the following difficulty. For example, when multiple portable music terminals carried into the vehicle are incapable of simultaneously having connection with the in-vehicle audio device, the in-vehicle audio device can display a list of tracks stored in one currently-connected portable music terminal but cannot display a list of tracks stored in another currently-unconnected portable audio terminal: Thus, the music data stored in the unconnected portable audio terminal cannot selected from the list displayed in the in-vehicle audio device and cannot be played back by the in-vehicle audio device in this situation. Therefore, the technique disclosed in Patent document 1 involves lack of usability.

SUMMARY OF THE INVENTION

In view of the above and other difficulties, it is an objective of the present invention to provide an in-vehicle audio device and an in-vehicle audio system that can have high usability.

According to a first aspect of the present invention, an in-vehicle audio device mounted to a vehicle is provided. The in-vehicle audio device includes a metadata acquisition section, a metadata registration section, a list creation section, a list display section, a music data acquisition section, and a playback output section. The metadata acquisition section is configured to acquire metadata of music data from each of multiple music possession devices. Each of the multiple music possession devices includes a storage medium storing therein the music data. At least one of the multiple music possession devices is a portable music carrier device capable of performing wireless communication. From the portable music carrier device, the metadata acquisition section acquires the metadata of the music data by the wireless communication. The metadata includes track information of the music data. The metadata registration section is configured to register the metadata acquired by the metadata acquisition section. The metadata registration section is further configured so that as for the metadata acquired from the portable music carrier device, registration of the metadata acquired from the portable music carrier device is maintained after a communication connection between the portable music carrier device and the in-vehicle audio device is cut off. The list creation section is configured to create a list from the metadata registered in the metadata acquisition section so that the list includes at least track. The list display section is configured to display the list created by the list creation section. The music data acquisition section is configured to acquire, from the multiple music possession devices, the music data corresponding to the tracks in the list displayed by the list display section. When acquiring the music data from the portable music carrier device, the music data acquisition section acquires the music data by the wireless communication. The playback output section is configured to play back and output the music data acquired by the music data acquisition section.

According to a second aspect of the present invention, an in-vehicle audio system is provided. The in-vehicle audio system includes the above-described in-vehicle audio device, and the above-described multiple music possession devices, at least one of which is the above-described portable music carrier device.

According to the above in-vehicle audio device and system, the registration of the metadata acquired from the portable music carrier device is maintained after the communication connection between the in-vehicle audio device and the portable music carrier device is cut off. Thus, it is possible to display the list containing a group of track originating from the portable music carrier device after the communication connection is cut off. It is possible to select a track from the list, acquire the music data corresponding to the selected track by the music acquisition section, and playback and output the music even when the music data corresponding to the selected track is stored in the storage medium of the currently-unconnected portable music carrier device. Therefore, it is possible to enhance usability.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF EMBODIMENTS

Figure 1:
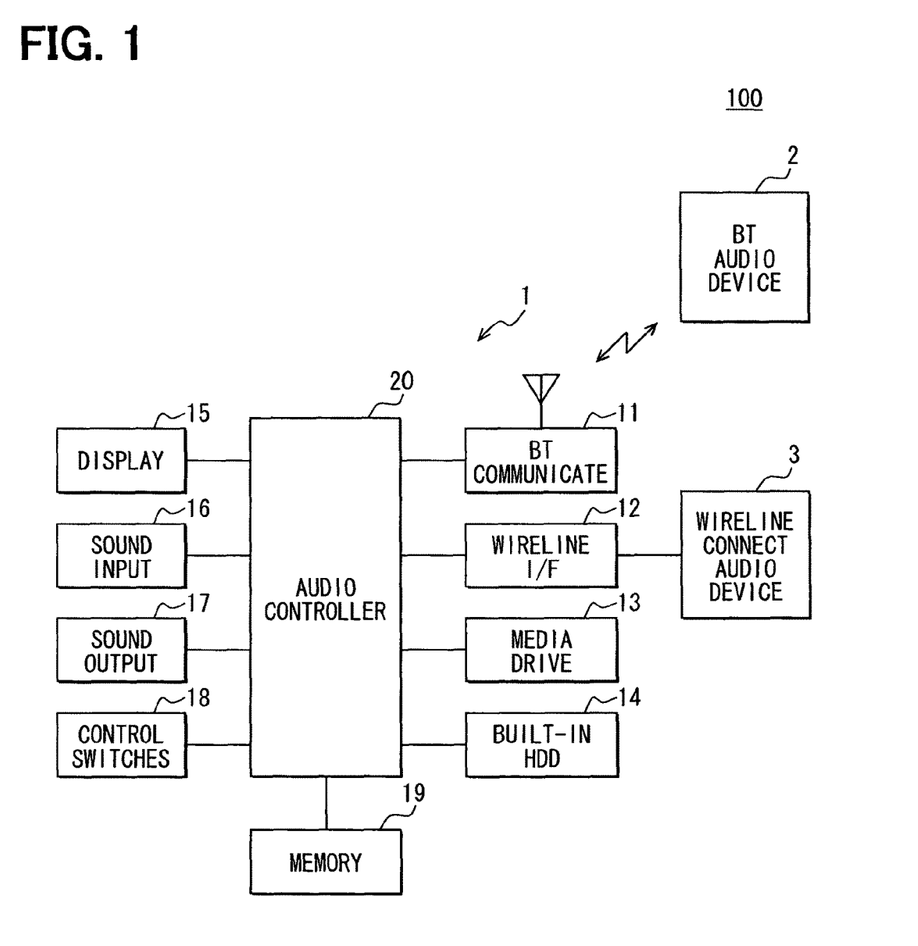
FIG. 1 is a block diagram illustrating a schematic configuration of an in-vehicle audio system.

Embodiments of the present invention will be described below with reference to the accompanying drawings. FIG. 1 is a block diagram illustrating a schematic configuration of an in-vehicle audio system 100 according to one embodiment. The in-vehicle audio system 100 is mounted to a vehicle, and includes an in-vehicle audio device 1, a BLUETOOTH audio device (referred to also as BT audio device for simplicity) 2, and a wireline connection audio device 3.

The BT audio device 2 is a portable device or terminal capable of performing BLUETOOTH communication with the in-vehicle audio device 1. The BT audio device 2 can be carried by a user. The BT audio device 2 includes a storage medium such as a flash memory, a hard disk drive (HDD) and the like to store therein music data in the form of digital data. To the in-vehicle audio device 1, the BT audio device 2 transmits the music data stored in the storage medium thereof. Further, the storage medium of the BT audio device 2 stores therein metadata of music data together with the music data. The metadata includes textual information associated with the music data. The BT audio device 2 can act as a music possession device, and can act as a portable music carrier device. Details of the metadata will be described later.

The BT audio device 2 transmits the music data by Bluetooth communication using Advanced Audio Distribution Profile (A2DP), which describes a transmission and reception method of music data. The BT audio device 2 transmits the metadata by Bluetooth communication using Audio/Video Remote Control Profile (AVRCP), which describes remote control of A/V equipment.

The BT audio device 2 of the present embodiment may perform Bluetooth communications by at least AVRCP version 1.3 or older (referred to also as AVRCP 1.3 for simplicity). According to specifications of AVRCP 1.3, when the in-vehicle audio device 1 plays back and outputs the music data of the BT audio device 2, the metadata of the currently-played-back music data can be extracted and transmitted to the in-vehicle audio device 1 but metadata of music data other than the currently-played-back music data cannot be extracted and transmitted to the in-vehicle audio device.

As long as the BT audio device 2 is a portable terminal or device capable of handling the digitalized music data and supporting BLUETOOTH communication, the BT audio device 2 is not be limited to a specific device or terminal. For example, the BT audio device 2 may be a digital audio player, a mobile phone or the like.

The wireline connection audio device 3 is a portable device capable of performing wireline communication such as USB (universal serial bus) communication and the like with the in-vehicle audio device 1. The wireline connection audio device 3 can be carried by a user. The wireline connection audio device 3 includes a storage medium such as a flash memory, a HDD and the like to store music data in the form of digital data. To the in-vehicle audio device 1, the wireline connection audio device 3 transmits the music data stored in the storage medium thereof by the wireline communication such as USB communication and the like. Further, the storage medium of the wireline connection audio device 3 stores therein metadata of music data together with the music data. The wireline connection audio device 3 can act as a music possession device.

As long as the wireline connection audio device 3 can handle the digitalized music data and can transmit and receive music data stored in a storage medium by wire communication such as USB communication and the like, the wireline connection audio device 3 is not be limited to a specific device. For example, the wireline connection audio device 3 may be a digital audio player or a mobile phone supporting USB communication, a USB memory, and the like. In the present embodiment, it is assumed that the wireline connection audio device 3 performs data transmission and reception with the in-vehicle audio device 1 by USB communication.

The in-vehicle audio device 1 has an audio function, and is configured to perform a variety of information processing. The in-vehicle audio device 1 may be integrated with an in-vehicle navigation device. Alternatively, the in-vehicle audio device 1 may external to an in-vehicle navigation device. Alternatively, the in-vehicle audio device 1 and the in-vehicle navigation device may or may not share some components.

A schematic configuration of the in-vehicle audio device 1 is described below.

As shown in FIG. 1, the in-vehicle audio device 1 includes a Bluetooth communication portion 11 (referred to as BT communication portion), a wireline I/F 12, a media drive 13, a built-in HDD 14, a display portion 15, a sound input portion 16, a sound output portion 17, a group of control switches 18, a memory portion 19, and an audio controller 20 connected with the foregoing components. The media drive 13 and the BUILT-IN HDD 14 may be external to the in-vehicle audio device 1.

The BT communication portion 11 includes a BT antenna, via which the BT communication portion 11 transmits a signal to the BT audio device 2 using 2.4 GHz band radio wave and receives a signal from the BT audio device 2 using 2.4 GHz band radio wave. The BT communication portion 11 is connected with the audio controller 20. The BT communication portion 11 causes the BT antenna to transmit a signal that is outputted from the audio controller 20. To the audio controller 20, the BT communication portion 11 outputs a signal that is received by the BT antenna.

The wireline I/F 12 is an interface, which mediates data transmission and reception between the wireline connection audio device 3 and the audio controller 20. The wireline I/F 12 may be, for example, a USB interface. The wireline I/F 12 may have multiple interfaces so that multiple wireline connection audio devices 3 are connectable to the wireline I/F 12 at the same time.

The media drive 13 reads out music data and its metadata from a storage medium (i.e., medium) such as a compact disk (CD), a mini disk (MD) and the like storing therein the music data and its metadata. The media drive 13 is also an example of a music possession device. The media drive 13 is a removable drive and has a medium insertion slot to which the medium is insertable. At an inside of the media drive 13, a motor for rotating a medium and a head for reading out music data on a surface of the medium are built-in.

As long as the media drive 13 is a removable drive for reading out music data form a medium, the media drive 13 is not limited to a specific one. For example, the media drive 13 may be integrated with a DVD drive. The media drive 13 may read out music data from media other than CD and MD. The media drive 13 may be an auto-changer drive, which has a function of receiving multiple media and conducting continuous playback throughout the multiple media.

The built-in HDD 14 is built in the in-vehicle audio device 1 and can store therein music data and its metadata. The built-in HDD 14 is also an example of a music possession device. The built-in HDD 14 can store therein the music data from the BT audio device 2, the wireline connection audio device 3, the media drive 13 and the like.

The display portion 15 may include a liquid crystal display or the like. In accordance with a signal from the audio controller 20, the display portion 15 displays various information on a display screen thereof. The various information includes control content of the in-vehicle audio device 1, metadata of music data stored in a music source, and the like. Herein, the music source refers to the BT audio device 2, the wireline connection audio device 3, the medium inserted in the media drive 13, the built-in HDD and the like, each of which has the music data.

The sound input portion 16 includes a microphone or the like to collect speech of a user. To the audio controller 20, the sound input portion 16 outputs speech data including information on the speech. The sound input portion 16 is arranged at a part where speech of a passenger (e.g., driver) of a vehicle is detectable. The speech data is, for example, a voice signal.

The sound output portion 17 includes an amplifier, a speaker and the like. The amplifier amplifies and converts a music information signal, which is associated with the music data played back by the audio controller 20. The speaker outputs the music based on the amplified and converted music information signal.

The group of control switches 18 includes, for example, a mechanical switch or a touch sensitive switch integrated with the display portion 15. In response to manipulation on the group of control switches 18, various instructions to the audio controller 20 can be issued. The various instructions may correspond to various functions, e.g., volume control, music playback, pause, next track, previous track, track selection, setting of rearrangement condition and the like.

The group of control switches 18 may not limited to the above example. For example, the in-vehicle audio device 1 may include a remote control device. In response to manipulation on a switch of the remote control device, various instruction signals can be inputted to the audio controller 20 via a remote control sensor. Thus, the remote control device can cause the audio controller 20 to execute functions, like the above-described group of control switches 18 can do. Moreover, the in-vehicle audio device 1 may be configured so that the speech data of the sound input portion 16 can be inputted as a speech command to the audio controller 20. Thereby, the sound input portion 16 may cause the audio controller 20 to execute functions, like the above-described group of control switches 18 can do.

The memory portion 19 includes a memory capable of electrically rewriting content (data) and storing a variety of information therein. For example, in accordance with instructions from the audio controller 20, the memory portion 19 can store music data and metadata that each music source has. An EEPROM (Electronically Erasable and Programmable Read Only Memory) may be used as the memory portion 19.

The audio controller 20 includes a microcomputer as a main component. The microcomputer includes a CPU (central processing unit), a ROM (read-only memory), a RAM (random access memory), I/O (input/output) and the like. The audio controller 20 performs various processes by executing various control programs stored in the ROM.

For example, the audio controller 20 performs a music source registration process to register an available music source in the following way. Regarding the BT audio device 2, the audio controller 20 registers the BT audio device 2 when a pairing between the BT audio device 2 and the in-vehicle audio device 1 is completed. Further, once the pairing between the BT audio device 2 and the in-vehicle audio device 1 is completed, the registration of the BT audio device 2 is maintained (held) even after the BT audio device 2 cuts off a communication connection to the in-vehicle audio device 1. Regarding the wireline connection audio device 3, the audio controller 20 registers the wireline connection audio device 3 when the in-vehicle audio device 1 has a communication connection to the wireline connection audio device 3 via the wireline I/F 12. When the wireline connection audio device 3 cuts off the communication connection to the in-vehicle audio device 1, the wireline connection audio device 3 is unregistered. Regarding the medium to be inserted in the media drive 13, the audio controller 20 registers the medium when the medium is inserted in the media drive 13. When multiple media are inserted in media drive 13, the audio controller 20 registers respective multiple media. When a medium is ejected from the media drive 13, the medium is unregistered. Regarding the built-in HDD 14, since the built-in HDD 14 is steadily connected with the in-vehicle audio device 1, the built-in HDD 14 is steadily in registration.

In the music source registration process, the registration may be conducted by storing information for identifying a music source in the memory portion 19. The information for identifying a music source may be as follow. Regarding the BT audio device 2, a device ID may be the information for identifying a music source. Regarding the wireline connection audio device 3, a place etc. of the interface of the wireline I/F 12 being used may be the information for identifying a music source. Regarding a medium inserted in the media drive 13, information as to which of the insertion slots is being used may be the information for identifying a music source.

The audio controller 20 may create a list of registered music sources (also referred to as a registered music source list) and may display the registered music source list on the display portion 15. A music source that a user would like to unregister may be selectable from the registered music source list via the group of control switches 18 or the sound input portion 16. When one music source is selected as a music source to be unregistered, the selected music source can be unregistered. According to this configuration, it is possible to unregister the BT audio device 2 and the built-in HDD 14.

The audio controller 20 further performs a metadata acquisition process to acquire metadata of music data from a music source registered at the music source registration process. In the above, the metadata includes at least track information, which is information on tracks of the music data. The audio controller 20 can act as a metadata acquisition section or means. The audio controller 20 further performs a metadata registration process to register the metadata acquired at the metadata acquisition process. The audio controller 20 registers the metadata by storing the acquired metadata in the memory portion 19. The audio controller 20 may be configured to acquire the metadata of all of the music data stored in the music source, or may be configured to acquire the metadata of a piece of the music data stored in the music source. In the present embodiment, for illustrative purpose, it is assumed that the audio controller 20 is configured to acquire the metadata of all of the music data.

Metadata of music data contains items that provide information on the music data, including tracks, a device name of a music possession device, a name of an artist, a tile of an album or a single, a genre, a playback time, a release year, a track number, and the like. In the above, the device name of a music possession device indicates a music possession device having the music data, e.g., the BT audio device 2, the wireline connection audio device 3, the built-in HDD 14, a medium inserted in the media drive 13. When the music possession device is the media drive 13; a name of the medium in the media drive 13 may be used as the device name of a music possession device. The device name of a music possession device can act as retrieval source device information, which is information about a retrieval source.

In the metadata acquisition process, the audio controller 20 acquires metadata of music data in the following manners. When the audio controller 20 acquires metadata of music data from the BT audio device 2 supporting AVRCP 1.3 or order version, the audio controller 20 acquires a piece of music data stored in the storage medium of the currently-connected BT audio device 2 by Bluetooth communication using A2DP, and the audio controller 20 playbacks the acquired piece of music data for a minimum period of time. During the playback of the acquired piece of music data for the minimum period of time, the audio controller 20 acquires the metadata of the piece of music data from the BT audio device 2 via Bluetooth communication using AVRCP 1.3. For all of the music data stored in the storage medium of the BT audio device 2, the audio controller 20 repeatedly performs the above process, thereby acquiring the metadata of all of the music data stored in the BT audio device 2.

The above-described minimum period of time is a time span in which the audio controller 20 can acquire metadata of a piece of music data during the playback of the piece of music data. The minimum period of time may be arbitrarily settable. When the audio controller 20 acquires metadata through the playback of music data for the minimum period of time, the audio controller 20 may play back only compressed music data and may not output it from the sound output portion 17.

Regarding acquisition of metadata from the BT audio device 2 supporting AVRCP newer than AVRCP 1.3 (e.g., AVRCP 1.4), the audio controller 20 acquires the metadata of all of the music data stored in the currently-connected BT audio device 2 by Bluetooth communication using AVRCP 1.4.

Regarding acquisition of metadata from the wireline connection audio device 3, the audio controller 20 acquires the metadata of all of the music data stored in the storage medium of the wireline connection audio device 3. Regarding acquisition of metadata from a medium inserted in the media drive 13, the audio controller 20 causes the media drive 13 to read out the metadata of all of the music data stored in the medium inserted in the media drive 13, and acquires the read-out metadata from the media drive 13. Regarding acquisition of metadata from the built-in HDD 14, the audio controller 20 acquires the metadata of all of the music data stored in the built-in HDD 14.

The metadata stored and registered in the memory portion 19 at the metadata registration process are respectively retrieved from multiple music sources. When a music source corresponding to a retrieval source of certain metadata is unregistered, the certain metadata is unregistered. When the registration of a music source corresponding to a retrieval source of certain metadata is maintained, the registration of the certain metadata is maintained even if there is no communication connection between the in-vehicle audio device 1 and the retrieval source of the certain metadata. The memory portion 19 can act as a metadata registration section or means.

The audio controller 20 performs a list creation process to create a list (also referred to as a playlist) based on the metadata stored in the memory portion 19, i.e., based on the registered metadata. The playlist includes at least tracks. The audio controller 20 can act as a list creation section or means. In the list creation process, the audio controller 20 creates a playlist in which items of the metadata acquired from the multiple music possession devices are integrated. The audio controller 20 arranges items of the registered metadata in accordance with a predetermined rule, thereby creating the playlist.

The predetermined rule may be referred to as a rearrangement condition to a playlist. The predetermined rule may be settable by a user via the group of control switches 18 or the sound input portion 16, or may be set by default. The group of control switches 18 or the sound input portion 16 can act as a rearrangement condition setting section or means. The predetermined rule may be to arrange tracks in an alphabetical order, in a play time order, in a release year order, in a track number order, a user-set program order or the like. Alternatively, the predetermined rule may be to arrange according to device name of possession device, according to artist, according to album title or single title, according to genre, according to release year, or the like. Alternatively, the predetermined rule may be a combination of multiple rules (i.e., conditions). For example, the predetermined rule may be to arrange tracks in such way that: the tracks are classified into multiple groups according to device name of possession device, album title or single title, genre, release year or the like; and tracks in each group is arranged in an alphabetical order.

For example, when the predetermined rule set by default is arrangement in an alphabetical order, items of the metadata are arranged so that tracks are arranged column-wise in an alphabetical order. Items of the metadata other than the track are arranged row-wise so that the items corresponding to each track are arranged in a row for the each track. For illustrative purpose, it is assumed that the predetermined rule is to arrange tracks in an alphabetical order, and the playlist is created from the track and the device name of a music possession device. In the case of this assumption, the playlist is created so that the tracks are arranged column-wise in an alphabetical order, and the name of a music possession device corresponding to each track is arranged row-wise in a row for the each track (see FIGS. 2 and 3).

The audio controller 20 further performs a list display process to cause the display portion 15 to display the playlist created at the list creation process. In the list display process, when the audio controller 20 is playing back the music data originating from a certain music possession device, the display portion 15 may highlight a group of tracks that originates from the certain music possession device. In the list display process, when the playlist contains a group of tracks originating from the BT audio device 2, the display portion 15 may additionally display information indicating whether the BT audio device 2 and the in-vehicle audio device 1 are having communication connection with each other, so that the information is associated with the group of tracks originating from the BT audio device 2. The display portion 15 and the audio controller 20 can act as a list display section or means.

The audio controller 20 may make a determination of whether the BT audio device 2 and the in-vehicle audio device 1 are having the communication, connection with each other, based on whether the Bluetooth communication is established between the BT communication portion 11 and the BT audio device 2. The audio controller 20 can act as a communication connection determination section or means.

Figure 2:
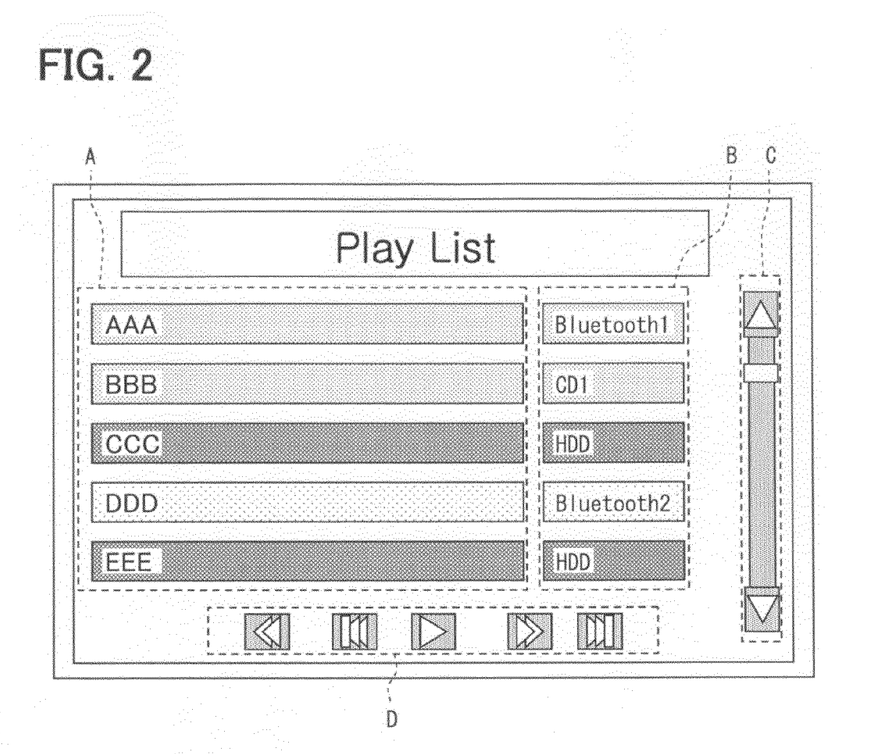
FIG. 2 is a diagram illustrating one example of a playlist displayed on a display portion.
Figure 3:
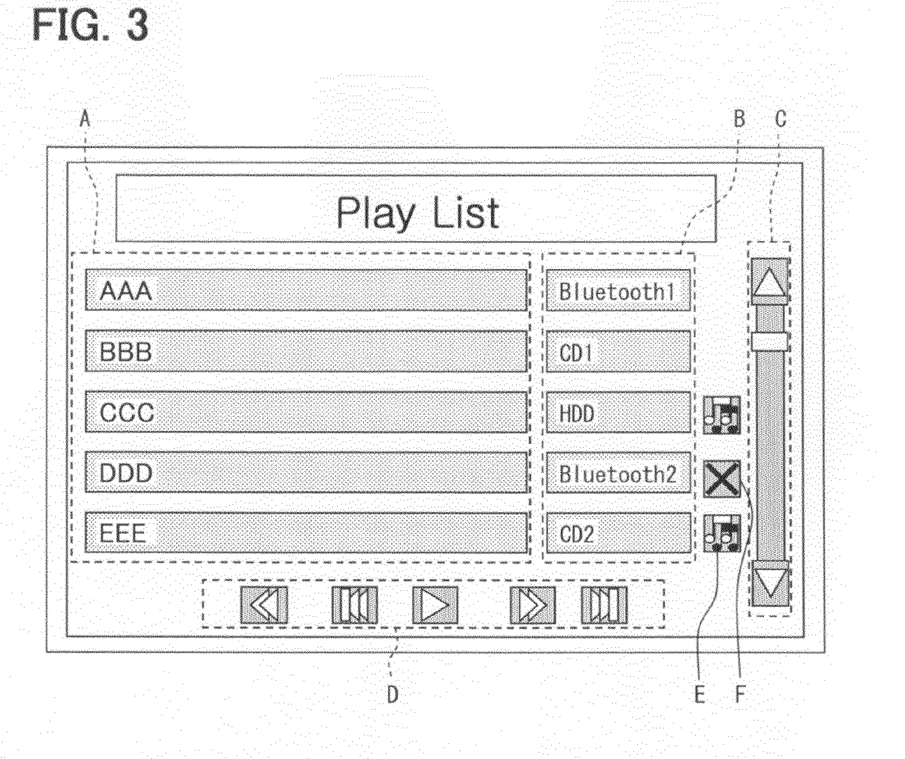
FIG. 3 is a diagram illustrating another example of the play list displayed on the display portion.

Display examples of the playlist on the display portion 15 are described below with reference to FIGS. 2 and 3. FIGS. 2 and 3 respectively illustrate display examples of the playlist on the display portion 15. In each of FIGS. 2 and 3, the tracks in the playlist are displayed in a region surrounded by the dashed-line "A". The device names of possession devices in the playlist are displayed in a region surrounded by the dashed-line "B". A vertical scroll bar is displayed in a region surrounded by the dashed-line "C". Audio control switches such as a playback switch, a pause switch, next track switch, a previous track switch and the like are displayed in a region surrounded by the dashed-line "D". Icons denoted by "E" in FIG. 3 are playing-back device icons. The playing-back device icons are displayed in association with a group of tracks originating from the music possession device having the currently-played-back music data. The playing-back device icons visually show that the group of tracks originates from the music possession device having the currently-played-back music data. An icon denoted by "F" in the FIG. 3 is an unconnected device icon. The unconnected device icon is displayed in association with a group of tracks originating from the BT audio device 2 that is not having the communication connection with the in-vehicle audio device 1. The unconnected device icon shows that the group of tracks originates from the BT audio device 2 that is not having the communication connection with the in-vehicle audio device 1. The vertical scroll bar and the audio control switches are parts of the group of control switches 18.

As shown in FIGS. 2 and 3, the playlist displayed on the display portion 15 has columns and rows. The tracks are arranged column-wise in an alphabetical order. For each track, the name of a music possession device is arranged row-wise in a row of the each track. A display region is movable (scrollable) upward and downward in response to operation on the vertical scroll bar on the display screen. The audio control switches on the display screen enables operation on the selected track, such as playback, pause, skip to next track, back to previous track and the like.

As shown in FIG. 2, when a certain music possession device (i.e., HDD in the case of FIG. 2) is a retrieval source of the currently-played-back music data, the device name of the retrieval source of the currently-played-back music data and a group of tracks originating from the retrieval source of the currently-played-back music data are highlighted. For example, a group of boxes displaying the device name of the retrieval source of the currently-played-back music data (see boxes for "HDD" in FIG. 2) is displayed in color different from another group of boxes, which display device names of music possession devices other than the retrieval source of the currently-played-back music data. Similarly, a group of boxes displaying tracks originating from the retrieval source of the currently-played-back music data (see the boxes for the tracks "CCC" and "EEE" in FIG. 2) is displayed in color different from another group of boxes displaying other tracks, which originate from music possession devices other than the retrieval source of the currently-played-back music data. In the case of FIG. 2, two BT audio devices 2 (named "Bluetooth 1" and "Bluetooth 2" in FIG. 2) are carried in the vehicle. One of the BT audio devices 2 named "Bluetooth 2" is not currently having the communication connection to the in-vehicle audio device 1. As shown in FIG. 2, a box displaying a track (see the box for the track "DDD") originating from the BT audio device 2 named "Bluetooth 2" and a box displaying "Bluetooth 2" are displayed in grayout, thereby adding the information indicating whether the BT audio device 2 is currently having the communication connection with the in-vehicle audio device 1.

In the example shown in FIG. 3, a group of tracks originating from a retrieval source of the currently-played-back music data is highlighted in the following way. The playing-back device icons are additionally displayed in association with the rows corresponding to the group of tracks originating from the retrieval source of the currently-played-back music data. The rows includes the boxes displaying the group of tracks (see the boxes for the tracks "CCC" and "EEE" in FIG. 3) and the boxes displaying the names of the retrieval source of the currently-played-back music data (see boxes for, "HDD" and "CD2" in FIG. 3). Moreover, the unconnected device icon is additionally displayed in the row of the track (see "DDD" in FIG. 3) originating from the BT audio device (see "Bluetooth 2" in FIG. 3) that is not currently having the communication connection with the in-vehicle audio device 1. Thereby, the unconnected device icon presents the information indicative of whether the BT audio device 2 is currently having the communication connection with the in-vehicle audio device 1.

A way to highlight may not be limited to and may be other than those illustrated in FIGS. 2 and 3. For example, the group of tracks and the device name of the retrieval source may be highlighted by being displayed in different text color, by being surrounded by a frame, or the like. The information indicating whether the in-vehicle audio device 1 is having the communication connection with the BT audio device 2 may be added in manners other than those illustrated in FIGS. 2 and 3. For example, the boxes displaying a group of tracks originating from the currently-connected BT audio device 2 and the boxes for displaying the device name of the currently-connected BT audio device 2 may be displayed in grayout. Alternatively, a connected device icon may be additionally displayed in association with a group of tracks originating from the BT audio device 2 that is currently having the communication connection. The connected device icon shows that the group of tracks originates from the BT audio device 2 that is currently having the communication connection.

In the examples shown in FIGS. 2 and 3, the playlist contains tracks and device names of music possession devices. However, the playlist is not limited to the examples shown in FIGS. 2 and 3. For example, among items of the metadata, the playlist may contain only track. Alternatively, the playlist may contain an item of metadata other than the track and the device name of music possession device. When the playlist further contains an item of the metadata other than on track and device name of music possession device, the item may be arranged row-wise on a track basis. In this case, in addition to the vertical scroll bar, a horizontal scroll bar may be displayed so that a display region is movable (scrollable) rightward and leftward.

When the audio controller 20 accepts a user input of selecting a track in the playlist on the display portion 15 via the group of control switches 18 or the sound input portion 16, the audio controller 20 performs a music acquisition process to acquire music data corresponding to the selected track from the music possession device that has the music data. The audio controller 20 can act as a music data acquisition section or means. The group of control switches 18 or the sound input portion 16 can act as a track selection section or means. The selected track may be also referred to as a target track.

For example, the following is a method for acquiring music data corresponding to a selected track from a music possession device that has the music data. When the audio controller 20 acquires the metadata including track information from a music possession device having music data, the audio controller 20 also acquires information for identification of the music data (called hereinafter as a music data identifier) and information for identification of the music possession device (called hereinafter as possession device identifier), and the track is connected to the music data identifier and the music possession device identifier. When the audio controller 20 acquires the music data corresponding to the selected track from the music possession device having the music data, the audio controller 20 identifies the music possession device having the music data based on the music data identifier and the music possession device identifier connected to the selected track, and the audio controller 20 acquires the music data corresponding to the selected track.

When a music possession device having music data corresponding to a selected track is other than a music possession device having the music data that has been played back most recently, the audio controller 20 automatically switches a connection partner and acquires the music data. For example, when the BT audio device 2 is a music possession device having the music data corresponding to a selected track, and when the wireline connection audio device 3 is a music possession device having music data that has been played back most recently, the audio controller 20 automatically switches the connection partner from the wireline connection audio device 3 to the BT audio device 2, and acquires the music data from the BT audio device 2. In the above, if the BT audio device 2, to which the connection partner is to be switched, is not having the communication connection with the audio controller 20, the audio controller 20 performs a polling between the BT communication portion 11 and the BT audio device 2 and establishes the communication connection between the BT communication portion 11 and the BT audio device 2, and the audio controller 20 acquires the music data from the BT audio device 2.

When multiple BT audio devices 2 are designed to be capable of simultaneously having communication connections with the in-vehicle audio device 1, and when a change in retrieval source of music data is within a change in retrieval source between the multiple BT audio devices 2, the audio controller 20 changes the retrieval source of music data from one BT audio device 2 and another BT audio device 2 without switching the communication connection, and acquires the music data from the another BT audio device 2: When multiple BT audio devices 2 are designed to be incapable of simultaneously having communication connections with the in-vehicle audio device 1, the audio controller 20 switches the communication connection and then changes the retrieval source of music data from one BT audio device 2 and another BT audio device 2 to acquire the music data from the another. BT audio device 2. In the above, the multiple BT audio devices 2 may be different in type from each other.

Some portable terminals may have a function of shifting to a sleep mode to save power consumption when operation is absent for a few minutes. This function of shifting to a sleep mode is referred to herein as a sleep function. When the BT audio device 2 has the sleep function and is in the sleep mode, the audio controller 20 may transmit, for example, a wakeup signal from the BT communication portion 11 to the BT audio device 2 to switch the BT audio device 2 into a wakeup mode, thereby causing the BT audio device 2 to ready to have a communication connection. According to this configuration, a user can be released from an effort of operating the BT audio device 2 to switch the BT audio device 2 into the wakeup mode when the BT audio device 2 is in the sleep mode. Therefore, it is possible to enhance usability.

The audio controller 20 further performs a music data playback process to play back the music data acquired from the music possession device. In the music data playback process, the audio controller 20 obtains the music information signal by playing back the compressed music data, and outputs the music information signal to the sound output portion 17. Then, the played-back music is outputted from the sound output portion 17. The audio controller 20 and the sound output portion 17 can act as a playback output section or means.

The audio controller 20 can acquire, plays back and outputs the music data corresponding to the track that is selected via the group of control switches 18 or the sound input portion 16.

The audio controller 20 may also perform an automatic playback operation, in which the audio controller 20 automatically acquires, plays back and outputs the music data in accordance with an order of the playlist. In this automatic playback operation, in accordance with an order of the playlist, the audio controller 20 may automatically switch the connection partner to acquire the music data in a manner similar to the above-described manner.

Figure 4:
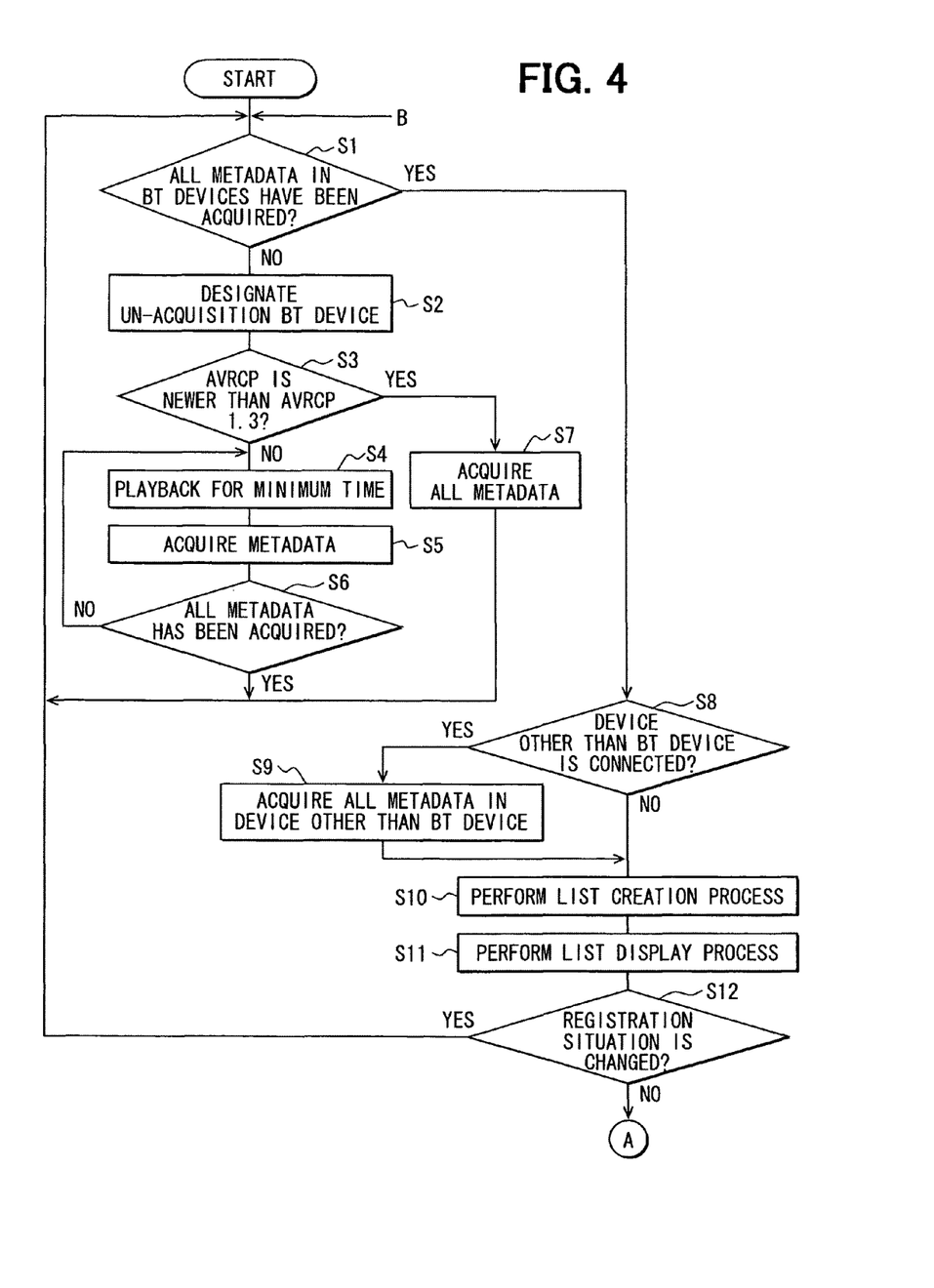
FIG. 4 is a flowchart illustrating an operation flow of an in-vehicle audio device.
Figure 5:
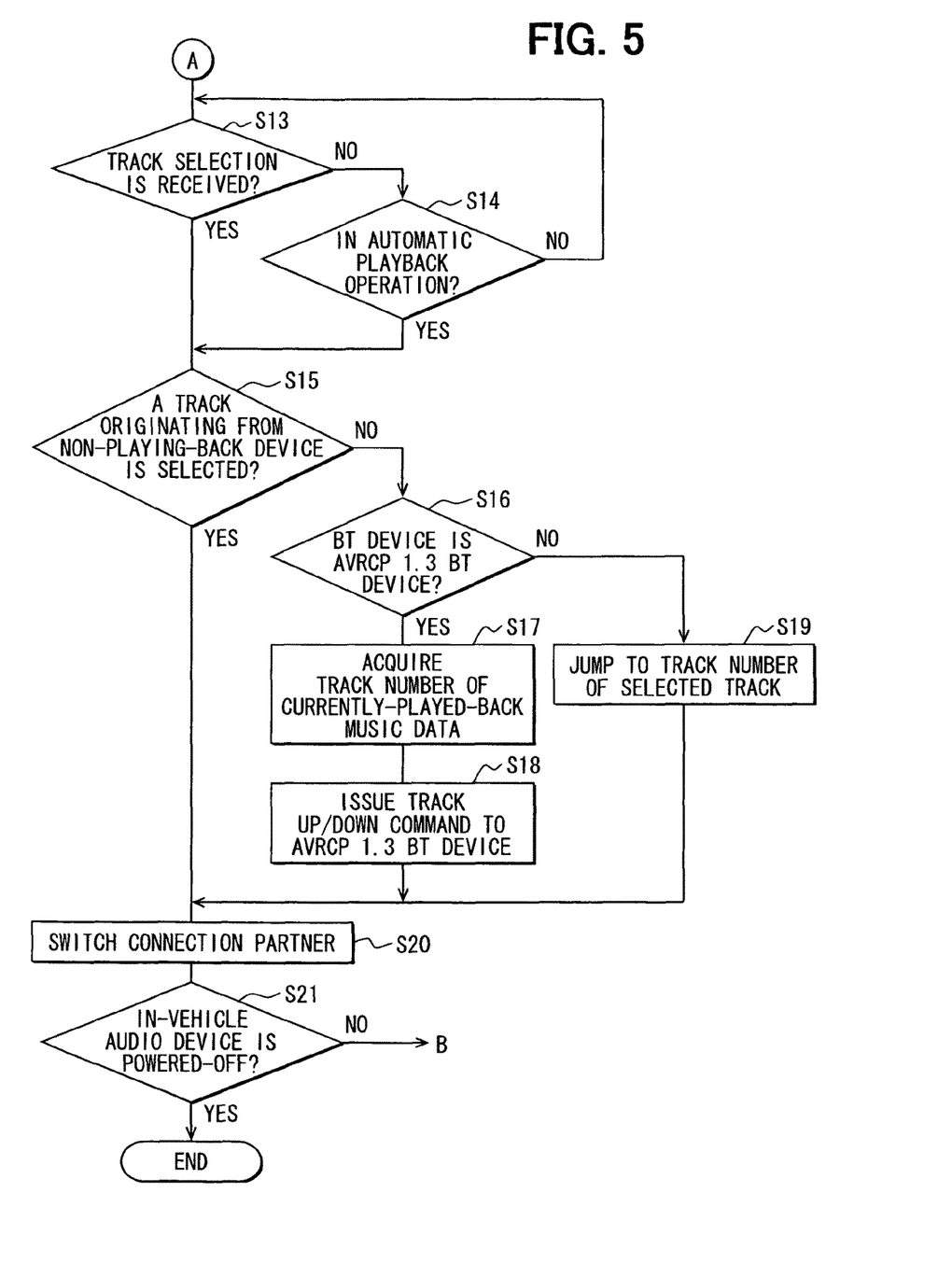
FIG. 5 is a flowchart illustrating an operation flow of the in-vehicle audio device.

An operation flow of the in-vehicle audio device 1 is described below with reference to FIGS. 4 and 5. FIGS. 4 and 5 are flowchart illustrating an operation flow of the in-vehicle audio device 1. The in-vehicle device 1 starts performing processes in the flowchart when an ACC switch or an ignition switch of the vehicle is turned on and the power is supplied to the in-vehicle audio device 1.

At S1, it is determined whether all of the metadata stored in the storage mediums of the BT audio devices 2, which have registered at the music source registration process, have been already acquired. When it is determined that all of the metadata in the BT audio devices 2 have been already acquired, corresponding to YES at S1, the flow proceeds to S8. When it is determined that all of the metadata in the BT audio devices 2 have not been acquired yet, corresponding to NO at S1, the flow proceeds to S2.

At S2, the audio controller 20 designates the BT audio device 2 from which the all of the metadata has not been acquired. The designated BT audio device 2, from which all of the metadata has not been acquired yet, is also referred to herein as an unacquisition BT device. At S3, the audio controller 20 determines whether the version of AVRCP of the unacquisition BT device is newer than the version 1.3. When the audio controller 20 determines that the version of AVRCP is newer than the version 1.3, corresponding to YES at S3, the flow proceeds to S7. When the audio controller 20 determines that the version of AVRCP is not newer than the version 1.3, corresponding to NO at S3, the flow proceeds to S4.

At S4, as described above in the explanation on the metadata acquisition process, the audio controller 20 acquires the music data stored in the storage medium of the unacquisition BT device by the Bluetooth communication using A2DP, and plays back the acquired music data for the minimum period of time. It should be noted that the unacquisition BT device is having the communication connection with the in-vehicle audio device 1 at S4. At S5, during the play back of the acquired music data for the minimum period of time, the audio controller 20 acquires the metadata of the played-back music data from the BT audio device 2 by Bluetooth communication using AVRCP 1.3.

At S6, it is determined whether all of the metadata stored in the unacquisition BT device has been acquired. When it is determined that all of the metadata in the unacquisition BT device has been acquired, corresponding to YES at S6, the flow returns to S1 and the flow is re-preformed from S1. When it is determined that all of the metadata in the unacquisition BT device has not been acquired, corresponding to NO at S6, the flow returns to S3, and the processes S3 to S6 are repeated until all of the metadata in the unacquisition BT device is acquired.

At S7, as described above in the explanation on the metadata acquisition process, the audio controller 20 acquires all of the metadata stored in the storage medium of the unacquisition BT device by, for example, BT communication using AVRCP 1.4. It should be noted that the unacquisition BT device is having the communication connection with the in-vehicle audio device 1 at S7.

At S8, the audio controller 20 determines whether the in-vehicle audio device 20 is connected a device or medium other than the BT audio device 2. In the above, the device or medium other than the BT audio device is, for example, the wireline connection audio device 3, the built-in HDD 14, the medium inserted into the media drive 13, and the like. When the audio controller 20 determines that a device or medium other than the BT audio device 2 is connected, corresponding to YES at S8, the flow proceeds to S9. When the audio controller 20 determines that a device or medium other than the BT audio device 2 is not connected, corresponding to NO at S8, the flow proceeds to S10.

At S9, as described above in the explanation on the metadata acquisition process, the audio controller 20 acquires all of the metadata stored in the medium or the storage medium of the device other than the BT audio device 2. Then, the flow proceeds to S10. At S10, the audio controller 20 performs the above-described list creation process. The flow proceeds to S11. At S11, the audio controller 20 performs the above-described list display process. The flow proceeds to S12.

At S12, the audio controller 20 determines whether there is a change in registration situation due to unregistration, ejection of a medium from the media drive 13, cut off of the communication connection between the in-vehicle audio device 1 and the wireline connection audio device 3, or the like. When the audio controller 20 determines that there is a change in registration situation, corresponding to YES at S12, the flow returns to S1. When the audio controller 20 determines that there is no change in registration situation, corresponding to NO at S12, the flow proceeds to S13.

At S13, the audio controller 20 determines whether a user input of selecting a track from the playlist displayed on the display portion 15 is accepted via the group of control switches 18 or the sound input portion 16. When the audio controller 20 determines that the user input of selecting a track is accepted, corresponding to YES at S13, the flow proceeds to S15. When the audio controller 20 determines that the user input of selecting a track is not accepted, corresponding to NO at S13, the flow proceeds to S14.

At S14, the audio controller 20 determines whether the automatic playback operation is being performed. It should be noted that in the automatic playback operation, the music data is successively acquired, played back and outputted in accordance with an order of the playlist, and a track to be played back next can be automatically selected. The track to be played back next may be also referred to as a selected track or a target track When the audio controller 20 determines that the automatic playback operation is being performed, corresponding to YES at S14, the flow proceeds to S15. When the audio controller 20 determines that the automatic playback operation is not being performed, corresponding to NO at S14, the flow returns to S13 and the process S13 is re-performed.

At S15, the audio controller 20 determines whether a music possession device having music data corresponding to a target track is other than a music possession device having music data that has been played back most recently. In short, the audio controller 20 determines whether a track originating from a non-playing-back device is selected. In the above, the target track is a track that is selected as a track to be played back next. When the audio controller 20 determines that a track originating from a non-playing-back device is selected, corresponding to YES at S15, the flow proceeds to S20. When the audio controller 20 determines that a track originating from a non-playing-back device is not selected, corresponding to NO at S15, the flow proceeds to S16.

At S16, the audio controller 20 determines whether the music possession device having the music data corresponding to the target track is a BT audio device 2 that performs Bluetooth communication using AVRCP 1.3 (also referred to as a BT device AVRCP 1.3). When the audio controller 20 determines that the carrier device having the music data corresponding to the target track is the BT device AVRCP 1.3, corresponding to YES at S16, the flow proceeds to S17. When the audio controller 20 determines that the music possession device having the music data corresponding to the target track is not the BT device AVRCP 1.3, corresponding to NO at S16, the flow proceeds to S19.

At S17, the audio controller 20 acquires a track number of the currently-played-back music data from the BT device AVRCP 1.3 via the BT communication portion 11, and the flow proceeds to S18. At S18, the audio controller 20 calculates a difference in track number between the track number acquired at S17 and the track number of the music data to be played back next, and issues track up/down commands to the BT device AVRCP 1.3 the number of times in accordance with the calculated difference. Thereby, the audio controller 20 acquires the music data to be played back next from the BT device AVRCP 1.3, and plays back and outputs the acquired music data. This configuration is useful when a track is selected via the next track operation or the previous track operation.

At S19, the audio controller 20 instructs the BT audio device 2 to jump to a track number of music data corresponding to the target track, which is selected as the track to be played back next. Thereby, the audio controller 20 acquires the music data to be played back next from the BT audio device 2, and plays back and outputs the acquired music data.

At S20, as described above, the audio controller 20 automatically switches the connection partner and acquires the music data. At S21, it is determined whether the in-vehicle audio device 1 is powered-off. When it is determined that the in-vehicle audio device 1 is powered-off, corresponding to YES at S21, the flow is ended. When it is determined that the in-vehicle audio device 1 is not powered-off, corresponding to NO at S21, the flow returns to S1.

According to the above configuration, even the music data is stored in the storage medium of the BT audio device 2 that is not currently having the communication connection with the in-vehicle audio device 1, a user can select a track corresponding to the music data from the playlist, and the audio controller 20 can acquire the music data via the BT communication portion 11 and playback and output the music data. Therefore, according to the above configuration, it is possible to enhance usability.

Moreover, according to the above configuration, when a group of tracks in the list originates from the music possession device having the currently-played-back music data, the group of tracks is displayed while being highlighted. Therefore, a user can easily distinguish which of the tracks originates from the music possession device having the currently-played-back music data. The music possession device having the music data that is being currently played back by the audio controller 20 is also referred as a played-back-music possession device. The music possession device that does not have the currently-played-back music data is referred to as a non-played-back-music possession device. When the music data is acquired from the non-playing-back-music possession device, it may be necessary to switch connection, and thus, it may be highly likely that it takes a longer time to acquire music data from the non-playing-back-music possession device than from the played-back-music possession device. However, according to the above configuration, a user can give priority to acquisition of music data from the played-back-music possession device. Thus, a user can avoid selecting tracks that may involve long waiting time; thereby, a user can listen to music with less waiting time.

Moreover, according to the above configuration, when the list contains a group of tracks originating from a BT audio device 2, the list is displayed such that the information indicative of whether the BT audio device 2 and in-vehicle audio device 1 are having the communication connection with each other is added to the group of tracks. Therefore, a user can easily distinguish which of the tracks originates from the BT audio device 2 having the communication connection with the in-vehicle audio device 1. When the music data is acquired from the BT audio device that is not having the communication connection with the in-vehicle audio device 1, it may take a time to establish the communication connection, and thus, it may take a longer time to acquire music data from the BT audio device 2 not having the communication connection than from the BT audio device 2 having the communication connection. According to the above configuration, a user can give priority to acquisition of music data from the BT audio device 2 having the communication connection. Therefore, a user can avoid selecting tracks that may involve longer waiting time; thereby a user can listen to music with less waiting time.

Moreover, according to the above configuration, a user can select his or her desired track from the playlist in which the metadata acquired from multiple music possession devices are integrated, while being unaware of which of the music possession devices has the music data corresponding to the desired track. In response to the above user selection of the desired track only, the in-vehicle audio device 1 can acquire, playback and output the music data corresponding to the desired track. Therefore, according to the above configuration, it is possible to further enhance usability.

Moreover, according to the above configuration, the in-vehicle audio device 1 can select and play back arbitrary music data stored in the BT audio device 2 performing Bluetooth communication using AVRCP 1.3. Therefore, it is possible to further enhance usability.

In the above embodiment, the BT audio device 2 supporting a BLUETOOTH communication function is described as an example of a portable music carrier device. However, the portable music carrier device is not limited to the BT audio device 2. For example, the portable music carrier device may be a portable device that employs a short range data communication method other than the BT communication. The short range data communication method may be for example an infrared communication or the like.

The present disclosure has the following aspect.

According to a first aspect, an in-vehicle audio device mounted to a vehicle is provided. The in-vehicle audio device includes a metadata acquisition section, a metadata registration section, a list creation section, a list display section, a music data acquisition section, and a playback output section. The metadata acquisition section is configured to acquire metadata of music data from each of multiple music possession devices. Each of the multiple music possession devices includes a storage medium storing therein the music data. At least one of the multiple music possession devices is a portable music carrier device capable of performing wireless communication. From the portable music carrier device, the metadata acquisition section acquires the metadata of the music data by the wireless communication. The metadata includes track information of the music data. The metadata registration section is configured to register the metadata acquired by the metadata acquisition section. The metadata registration section is further configured so that as for the metadata acquired from the portable music carrier device, registration of the metadata acquired from the portable music carrier device is maintained after a communication connection between the portable music carrier device and the in-vehicle audio device is cut off. The list creation section is configured to create a list from the metadata registered in the metadata acquisition section so that the list includes at least track. The list display section is configured to display the list created by the list creation section. The music data acquisition section is configured to acquire, from the multiple music possession devices, the music data corresponding to the tracks in the list displayed by the list display section. When acquiring the music data from the portable music carrier device, the music data acquisition section acquires the music data by the wireless communication. The playback output section is configured to play back and output the music data acquired by the music data acquisition section.

According to the above in-vehicle audio device, the registration of the metadata acquired from the portable music carrier device is maintained after the communication connection between the in-vehicle audio device and the portable music carrier device is cut off. Thus, it is possible, to display the list containing a group of track originating from the portable music carrier device after the communication connection is cut off. Therefore, it is possible to select a track from the list, acquire the music data corresponding to the selected track, and playback and output the music even when the music data corresponding to the selected track is stored in the storage medium of the currently-unconnected portable music carrier device. Therefore, it is possible to enhance usability. In the above, the portable music carrier device can transmits and receive data by at least wireless communication.

The above in-vehicle audio device may be configured as follows. In addition to the track information, the metadata may further include retrieval source information indicating which of the multiple music possession devices is a retrieval source of the metadata. Based on the metadata registered in the metadata registration section, the list creation section may create the list in which the retrieval source information is added to each of the tracks.

The in-vehicle audio device may be configured as follows. Based on the metadata registered in the metadata registration section, the list creation section may create the list in which the metadata acquired from the plurality of music possession devices are integrated.

The in-vehicle audio device may be configured as follows. The list display section displays the list trough highlighting a group of tracks in the list, the group of tracks being originating from a retrieval source of the music data that is currently being played back by the playback output section. According to this configuration, a user can easily distinguish which of the tracks originates from the retrieval source of the currently-played-back music data. When the music data is acquired from the music possession device other than the retrieval source of the currently-played-back music data, it may be highly likely that it takes a longer time to acquire music data from the music possession device other than the retrieval source of the currently-played-back music data than it takes a time to acquire the music data from the non-playing-back-music possession device. According to the above configuration, a user can give priority to acquisition of music data from the retrieval source of the currently-played-back music data. Therefore, a user can listen to music with less waiting time.

The in-vehicle audio device may be configured as follows. The in-vehicle audio device may further include a communication connection determination section configured to make a determination of whether the in-vehicle audio device is having the communication connection to the portable music carrier device. In accordance with the determination made by the communication connection determination section, the list display section may display the list so that information indicative of whether the in-vehicle audio device is having the communication connection to the portable music carrier device is added to a group of tracks originating from the portable music carrier device. According to this configuration, a user can easily distinguish which of the tracks originate from the portable music carrier device having the communication connection with the in-vehicle audio device. When the music data is acquired from the portable music carrier device that is not having the communication connection with the in-vehicle audio device 1, it may takes a longer time to acquire music data from the portable music carrier device not having the communication connection than the portable music carrier device having the communication connection. According to the above configuration, a user can give priority to acquisition of music data from the portable music carrier device having the communication connection. Therefore, a user can listen to music with less waiting time.

The above in-vehicle device may further include a rearrangement condition setting section configured to accept a user input that designates a rearrangement condition. In creating the list, the list creation section may rearrange items in the list in accordance with the list rearrangement condition designated via the rearrangement condition setting section. According to this configuration, it is possible to display the list so that an order of the items in the list matches user preference, and it is possible to further enhance usability.

The above in-vehicle audio device may be configured as follows. The music data acquisition section may acquire the music data while automatically switching a connection party between the multiple music possession devices in accordance with an order of the items in the list, which is created by the list creation section through rearrangement of the items in the list. According to this configuration, without user operation on the multiple music possession devices, it is possible to playback and output the music data stored in the storage mediums of the multiple music possession devices in accordance with the order of the items of the list. Therefore, it is possible to further enhance usability.

The above in-vehicle audio device may be configured as follows. The in-vehicle audio device may further include a track selection section configured to accept a user input that selects a target track from the tracks in the list, which is displayed by the list display section. The music data acquisition section may acquires the music data corresponding to the target track from one of the multiple music possession devices that has the music data corresponding to the target track. According to this configuration, a use can select a track from the displayed list in which respective metadata acquired from the multiple music data possession devices are integrated. In order to cause the in-vehicle audio device to acquire and play back his desired music, all the user has to do is to select a desired track from the like while being unaware of which of the multiple music possession devices stores the desired music data in the storage medium. Therefore, it is possible to further enhance usability.

The above in-vehicle audio device may be configured as follows. When the one of the multiple music possession devices having the music data corresponding to the target track is other than a retrieval source of the music data that has been played back most recently, the music data acquisition section automatically switches a connection party between the plurality of music possession devices and acquires the music data corresponding to the target track. According to this configuration, without user operation on the music possession devices, it is possible to play back and output the music data that corresponds to the target track selected via the track selection section and that is stored in the storage medium of the retrieval source of the metadata corresponding to selected track. It is therefore possible to further enhance usability.

The above in-vehicle audio device may be configured as follows. The portable music carrier device performs Bluetooth communication using Audio/Video Remote Control Profile (AVRCP). The metadata acquisition section acquires the metadata from the portable music carrier device by the Bluetooth communication using AVRCP.

It is known that according to Bluetooth communication using AVRCP version 1.3 or older (called here AVRCP 1.3), only metadata of the currently-played-back music data, which is transmitted from one device to another device by Bluetooth communication in order to playback the music data, is allowed to be transmitted and received. In a comparison example, it is impossible to acquire, from a portable music carrier device by Bluetooth communication using AVRCP 1.3, the metadata of all of the music data stored in the storage medium of the portable music carrier device. Therefore, according to the comparison example, when one portable music carrier device performs Bluetooth communication using AVRCP 1.3, arbitrary music data in the one portable music carrier device cannot be selected and played back in another device. This involves lack of usability.

In contrast, the in-vehicle audio device may be configured as follows. If the Audio/Video Remote. Control Profile allows acquisition of only the metadata of the music data that is being played back by the playback output section, the metadata acquisition, section may acquire the metadata of all of the music data in the storage medium of the portable music carrier device in such manner that the metadata acquisition section acquires the metadata while the playback output section is playing back only a piece of the music data. According to this configuration, even by Bluetooth communication using AVRCP 1.3, it is possible to acquire the metadata of all of the music data stored in the storage medium of the portable music carrier device. Thus, arbitrary music data in the portable music carrier device performing the Bluetooth communication using AVRCP 1.3 can be selected and played back in the in-vehicle audio device. Therefore, it is possible to further enhance usability.

According to a second aspect, an in-vehicle audio system is provided. The in-vehicle audio system includes: the above-described in-vehicle audio device; and the multiple music possession devices, at least one of which is the above-described portable music carrier device. According to the in-vehicle audio system also, it is possible to further enhance usability.

Embodiments of the present invention are not limited the above embodiments and modifications thereof. That is, the above embodiments and modifications thereof may be modified and/or combined in various ways without departing from the sprit and scope of the invention.

Further, each or any combination of procedures, processes, steps, or means explained in the above may be achieved as a software section or unit (e.g., subroutine) and/or a hardware section or unit (e.g., circuit or integrated circuit), including or not including a function of a related device; furthermore, the hardware section or unit can be constructed inside of a microcomputer.

Furthermore, the software section or unit or any combinations of multiple software sections or units may be included in a software program, which is contained in a computer-readable storage media or is installed in a computer via a communications network.

What is claimed is:

1. An in-vehicle audio device mounted to a vehicle, the in-vehicle audio device comprising:
    a metadata acquisition section configured to acquire a metadata from each of a plurality of music possession devices, wherein the metadata which is acquired includes (i) information on tracks of a music data and (ii) retrieval source information, wherein the retrieval source information in the metadata which is acquired indicates which of the plurality of the music possession devices is a retrieval source of the metadata, wherein each of the plurality of the music possession devices includes a storage medium storing therein the music data, wherein at least one of the plurality of the music possession devices is a portable music carrier device capable of performing a wireless communication, wherein the metadata acquisition section acquires the metadata from the portable music carrier device by the wireless communication;
    a metadata registration memory device configured to register the metadata acquired by the metadata acquisition section from the each of the plurality of the music possession devices, the metadata registration memory device being further configured so that as for the metadata acquired from the portable music carrier device by the metadata acquisition section, registration of the metadata acquired from the portable music carrier device by the metadata acquisition section is maintained after the wireless communication between the portable music carrier device and the metadata acquisition section of the in-vehicle audio device is cut off;
    a list creation section configured to create a list from the metadata registered in the metadata registration memory device so that the list includes at least the tracks of the music data;
    a list display section configured to display the list created by the list creation section;
    a music data acquisition section configured to acquire, from the plurality of the music possession devices, the music data corresponding to the tracks of the music data in the list which is displayed by the list display section, wherein when acquiring the music data from the portable music carrier device, the music data acquisition section acquires the music data by the wireless communication;
    a playback output section configured to play back and output the music data acquired by the music data acquisition section from the plurality of the music possession devices; and
    a track selection section configured to accept a user input for selecting a target track from the tracks of the music data in the list which is displayed by the list display section,
    wherein:
    based on the metadata registered in the metadata registration memory device, the list creation section integrates the metadata acquired from the plurality of the music possession devices by the metadata acquisition section and creates the list which includes at least the tracks of the music data so that each track in the list is provided with at least the retrieval source information indicating which of the plurality of the music possession devices is a retrieval source of the metadata for the each track in the list which is displayed by the list display section; and
    when the track selection section accepts the user input for selecting the target track from the list which is displayed by the list display section:
        the music data acquisition section acquires the music data of the selected target track from one of the plurality of the music possession devices;
        the playback output section plays back and outputs the acquired music data of the selected target track; and
        in a situation that the list which is displayed by the list display section simultaneously includes both (a) tracks having a same retrieval source as a retrieval source of the selected target track and (b) tracks having a different retrieval source than the retrieval source of the selected target tracks, the list display section highlights, in the list which is displayed by the list display section, to distinguish tracks whose retrieval source is the one of the plurality of the music possession devices and is the same as the retrieval source of the selected target track selected by the track selection section and currently played by the playback output section, from tracks whose retrieval source is not the same as the retrieval source of the selected target track selected by the track selection section and currently played by the playback output section:
            (i) the selected target track, which is currently played back, and
            (ii) a non-played-back track whose retrieval source is the one of the plurality of the music possession devices which is the same as the retrieval source of the selected target track selected by the track selection section and currently played by the playback output section.

2. The in-vehicle audio device according to claim 1, further comprising
    a communication connection determination section configured to make a determination of whether the in-vehicle audio device is having the wireless communication to the portable music carrier device,
    wherein
    in accordance with the determination made by the communication connection determination section, the list display section displays the list so that information indicative of whether the in-vehicle audio device is having the wireless communication to the portable music carrier device is added to a group of tracks originating from the portable music carrier device.

3. The in-vehicle audio device according to claim 1, further comprising:
    a rearrangement condition setting section configured to accept a user input that designates a rearrangement condition,
    wherein
    in creating the list, the list creation section rearranges items in the list in accordance with the list rearrangement condition designated via the rearrangement condition setting section.

4. The in-vehicle audio device according to claim 3, wherein the music data acquisition section acquires the music data while automatically switching a connection party between the plurality of the music possession devices in accordance with an order of the items in the list, which is created by the list creation section through rearrangement of the items in the list.

5. The in-vehicle audio device according to claim 1, wherein when the one of the plurality of the music possession devices having the music data corresponding to the target track is other than a retrieval source of the music data that has been played back most recently, the music data acquisition section automatically switches a connection party to the one of the plurality of the music possession devices and acquires the music data corresponding to the target track from the one of the plurality of the music possession devices.

6. The in-vehicle audio device according to claim 1, wherein the portable music carrier device performs BLUETOOTH communication using Audio/Video Remote Control Profile; and the metadata acquisition section acquires the metadata from the portable music carrier device by the BLUETOOTH communication using Audio/Video Remote Control Profile.

7. The in-vehicle audio device according to claim 6, wherein:

if the Audio/Video Remote Control Profile allows acquisition of only the metadata of the music data that is being played back by the playback output section, the metadata acquisition section acquires the metadata of all of the music data in the storage medium of the portable music carrier device in such manner that the metadata acquisition section acquires the metadata while the playback output section is playing back only a piece of the music data.

8. An in-vehicle audio system comprising:

the in-vehicle audio device according to claim 1; and the plurality of the music possession devices according to claim 1, wherein the at least one of the plurality of the music possession devices is the portable music carrier device according to claim 1.

9. The in-vehicle audio device according to claim 1, wherein:

the plurality of the music possession devices other than the portable music carrier device is a wireline connection audio device, which performs the wireline communication.

* * * * *